(12) United States Patent
O'Neil

(10) Patent No.: US 6,275,489 B1
(45) Date of Patent: *Aug. 14, 2001

(54) TELECOMMUNICATIONS SYSTEM

(75) Inventor: Dominic Desmond Phelim O'Neil, Bristol (GB)

(73) Assignee: Orange Personal Communications Services Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/128,953

(22) Filed: Aug. 5, 1998

(30) Foreign Application Priority Data

Aug. 6, 1997 (GB) .................................................. 9716700

(51) Int. Cl.⁷ .............................. H04L 12/28; H04Q 7/00; H04Q 7/20
(52) U.S. Cl. ........................ 370/351; 370/328; 455/433; 455/456
(58) Field of Search .................................. 370/449, 431, 370/328, 329, 341, 357, 346; 455/456, 524, 422, 432, 433, 435, 517

(56) References Cited

U.S. PATENT DOCUMENTS

| | | | | |
|---|---|---|---|---|
| 5,579,375 | * | 11/1996 | Ginter | 379/59 |
| 5,825,759 | * | 10/1998 | Liu | 370/331 |
| 6,038,451 | * | 3/2000 | Syed et al. | 455/445 |
| 6,038,456 | * | 3/2000 | Colby et al. | 455/456 |
| 6,134,433 | * | 10/2000 | Joong et al. | 455/417 |
| 6,167,256 | * | 12/2000 | Yla-Outinen | 455/417 |

FOREIGN PATENT DOCUMENTS

| | | |
|---|---|---|
| WO 95/20299 | 7/1995 | (WO) . |
| WO 96/11557 | 4/1996 | (WO) . |
| WO96/1157 | 4/1996 | (WO) . |
| WO 97/07644 | 2/1997 | (WO) . |

OTHER PUBLICATIONS

Giordano, et al., "PCS Number Portability," 1994 (IEEE International Symposium on Personal, Indoor and Mobile Radio Communications—Abstract).

* cited by examiner

Primary Examiner—Ajit Patel
Assistant Examiner—Duc Ho
(74) Attorney, Agent, or Firm—Townsend and Townsend and Crew LLP

(57) ABSTRACT

A telecommunications system including a plurality of mobile telephones has a switch network including: data storage units (HLR) for storing connection data relating to respective mobile telephones; a register (15) for storing associations between data storage units and respective identification codes; inputs for inputting an identification code; and a switch unit (30, 31) for interrogating the register (15) to permit determination of the data storage unit (HLR) associated with that identification code. The switch network then uses the connection data stored by the data storage unit (HLR) to form a telecommunication link with the corresponding mobile telephone. The register unit (15) has two states. In a first state the register unit (15) and switch unit (30, 31) determine the data storage unit (HLR) associated with the input identification code. In a second state, the register unit (15) is linked to a routing unit (40). The routing unit (40) may then handle the call in one of various different ways such as re-routing the call back to the network or terminating the call. The state of the register unit (15) is determined by a condition such as time of day or origin of call.

14 Claims, 2 Drawing Sheets

TELECOMMUNICATIONS SYSTEM

BACKGROUND OF THE INVENTION

1. Field of the Invention

The present invention relates to a telecommunication system. It is particularly, but not exclusively, concerned with a telecommunications system for mobile telephones.

2. Summary of the Prior Art

The present invention arises as a development of the ideas disclosed in WO 96/11557. A call to a mobile telephone is not to a fixed point, and therefore the system must determine the location of the destination. In arrangements prior to that disclosed in WO96/11557, a call to a mobile telephone results in a signal being transmitted to a data storage unit in the form of a Home Location Register unit (HLR) which determines the location of the mobile telephone, and so permits routing of the call to occur. Inevitably, HLRs have a limited capacity, and some arrangement is therefore necessary to enable telecommunication systems to access multiple HLRs. Therefore, WO96/11557 proposed that the switch network which connects users to other users, HLRs, and system services, had a register unit associated therewith, which register unit contained information relating each telephone number to a corresponding one of a plurality of HLRs. The relationship between telephone numbers and HLRs was then freely selectable within the register unit, so that the register unit acted as a converter between the number and the information identifying the HLR. By providing such a register unit, the fixed relationship between numbers and HLRs was broken, and any telephone number was then assignable to any HLR, assuming space permitted. Note that, although not explicitly mentioned in WO96/11557, it is not necessary that the different HLRs belong to a single service provider thus, it was possible for a user to have the same telephone number even when changing from one service provider to another.

WO96/11557 also mentioned that the register unit may also store further information associated with the mobile telephones which permitted the switch network to enable calls from mobile telephones to be routed to different services, depending on the calling mobile telephone itself, in addition to the number dialled.

SUMMARY OF THE INVENTION

In the disclosure of WO96/11557, such additional routings were triggered by the user inputting appropriate codes. However, it has been realised that by providing additional processing at the register unit, the functioning of the system disclosed in WO96/11557 may be further developed.

The present invention proposes that predetermined conditions are stored within the register unit for individual telephone numbers, or for groups of telephone numbers, which conditions control the register unit to cause the register unit to switch between a first state in which it operates as in WO96/11557 to cause appropriate access to an HLR, and at least a second state in which the call is directed to one or more further processing units (hereinafter referred to as routing units). The or each routing unit may handle the call in various different ways, such as re-routing the call back to the telephone network, or terminating the call at the routing unit, possibly in combination with a message being returned to the telephone that originated the call.

In addition to the second state, it is possible for the register unit to be controlled to have a third state in which it neither operates as in WO96/11557 nor directs the call to one or more routing units. In this third state, the register unit may perform other actions, such as a general override of the predetermined conditions to allow correct interaction with other telecommunication services in the switch network. A different signal to the register unit at a later point in the call setup may result in the register unit reverting to the second state.

It is preferable for the register unit and the or each routing unit to be separate physical components. In such circumstances in the second state, the call is directed from the register unit to one of the routing units, before being handled by that routing unit. However, it is not excluded from the present invention that the register unit and the or all routing units are integrated into a single structure, and have components in common. The register unit and routing unit(s) of the invention may then be considered as separate functions within that structure. In such a case, since the call will be handled within the structure, it is not appropriate to think of the call being passed from the register unit to the routing unit.

Suppose, for example, the predetermined conditions relate co times of the day. At first time of the day, eg normal working hours, a call to a mobile telephone received by the telephone network results in a signal to the register unit which converts the number in the received signal to information identifying the appropriate HLR, and the signal is then routed to the mobile telephone in the normal way. This is thus as described in WO96/11557. However, at other times of the day, the register unit directs the call to the routing unit, which may then re-direct the call to some other number, such as the home telephone number of the owner of the mobile telephone. From the point of view of the person initiating the call, the same number is used at all times, but the destination number changes. That change is controlled by predetermined conditions in the register unit, and also in the routing unit.

It should be noted that the present invention is not limited to the case where the predetermined conditions relate to times of day, week, etc. They may, for example, relate to the origin of the call, the availability of the destination mobile telephone, or may simply be set on and off on a manual basis.

It is also not necessary in the present invention that there is only a single routing unit; in practice there may be a plurality of them. Where a plurality of routing units are associated with a single register unit, the selection of the appropriate routing unit may depend on both the source of the call and its destination. Different services may be provided via different routing units, and thus the selection of the routing unit may depend on the service that is needed by the incoming call.

Furthermore, the same service may be provided by all or many routing units and selection of the routing unit may depend on the location of the call, with the most conveniently located routing unit being used.

It can be noted that the choice of routing unit is, at least partially, affected by the requirements for information storage in the system. The predetermined is conditions, which may vary from one mobile telephone to another, need to be stored at, or associated with, the register unit. However, any further information about subsequent routing, such as alternative destinations for the call, etc, may then be stored at the routing unit.

In the arrangements described above, one type of call may cause problems in this arrangement, namely calls to the originally dialled mobile telephone which originate at the routing unit itself. Those calls, after they have been returned to the network by the routing unit, must not be returned to the routing unit by the action of the register unit. It is therefore necessary that the register unit recognises calls of this type it receives which have already passed back to the network by the routing unit, so that the register will not route them to that further routing unit again.

BRIEF DESCRIPTION OF THE DRAWINGS

An embodiment of the present invention will now be described in detail, by way of example, with reference to the accompanying drawings, in which.

DETAILED DESCRIPTION

Figure 1:
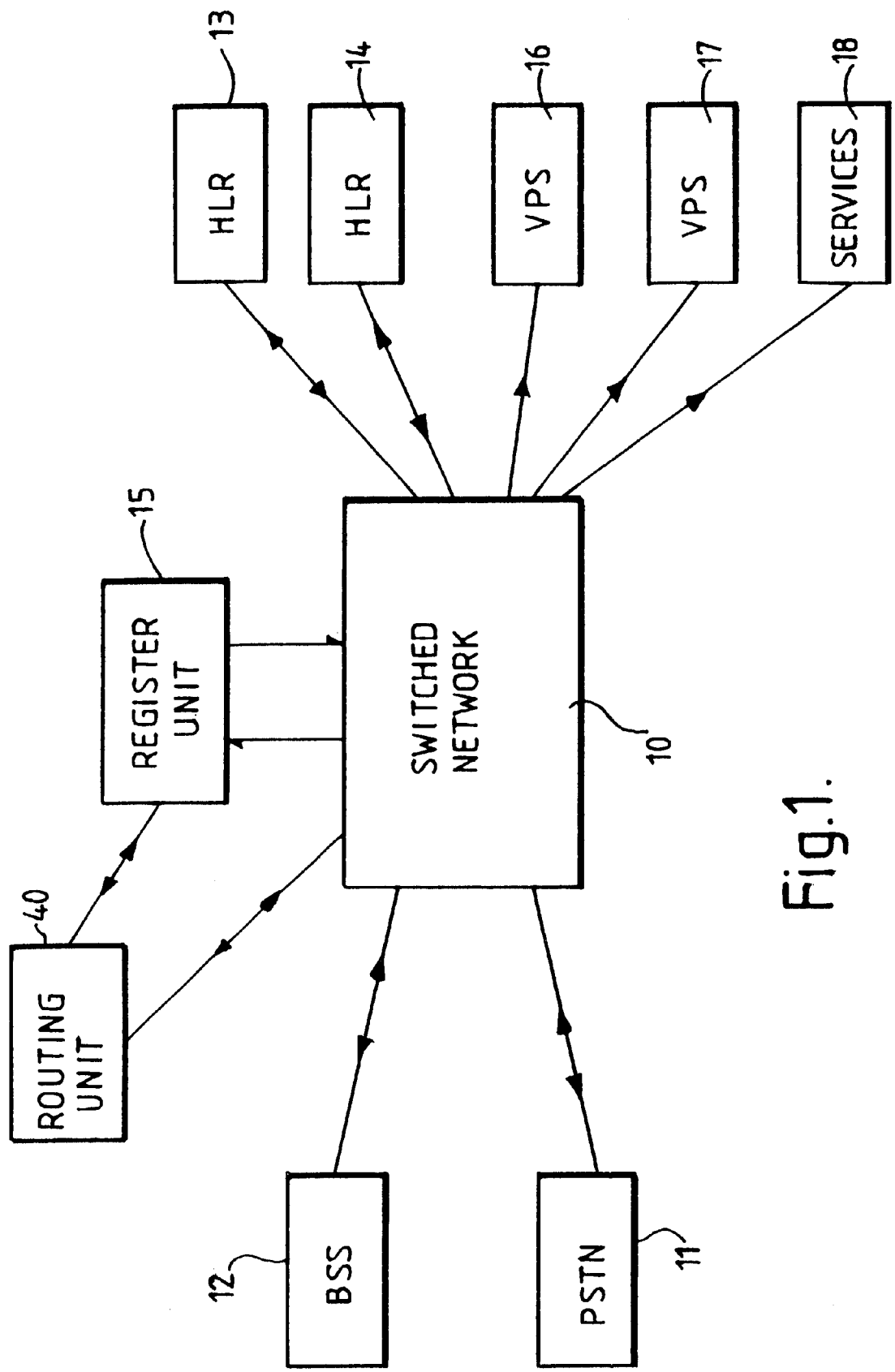
FIG. 1 is a schematic block diagram of a telecommunication system incorporated in the present invention.

Referring first to FIG. 1, and as described in WO 96/11557, a switched network 10 interconnects land-based and mobile telephones. If a call to a mobile telephone is made from a land-based telephone, the call is routed via the public switch telephone network (PSTN) 11 to the switch network, and from that switch network 10 to the mobile telephone (BSS) 12. To do this, the switched network 10 must determine routing information, and to determine that routing information it must determine the location of the mobile telephone 12, which it does via a HLR to which the mobile telephone 12 is associated. When there are multiple HLRs 13,14, it is necessary for the switched network 10 to determine which HLR 13,14 must be accessed, on the basis of the telephone number (MSISDN number) of the mobile telephone input by the originator of the call.

The switch network 10 accesses a register unit 15, which identifies the called number and addresses it to a particular HLR 13,14 with which the mobile telephone 12 is associated. The register unit 15 permits the relationship between any given mobile telephone number and the HLRs 13,14 to be determined freely, so that the number is unaffected by the particular HLR 13,14 with which it is associated. The register unit 15 removes the need for a particular mobile telephone number to be associated with a fixed HLR 13,14.

Once the particular HLR 13,14 with which the mobile telephone 12 is associated has been identified, signalling can occur to that HLR, and information derivable therefrom, in the usual way. This information is used to "set-up" the call to the mobile telephone 12, which may then be routed to the destination telephone or to some other destination as is normal.

Similarly, if a call originates at the mobile telephone 12, the switched network 10 must again determine the routing of that call. If the call is to a land-based telephone, connected to the switched network 10 via the PSTN 11, then this routing can be on the basis of the telephone number of the destination telephone, in the normal way.

If a call is made from a mobile telephone 12 to one of a plurality of voice processing systems 16,17 or to services 18 associated with the switch network using a particular code (e.g. 123) the relationship between the mobile telephone 12 and the corresponding service must be determined by the register unit 15 before the switch network can determine the appropriate voice processing system 16,17 or services 18 to be accessed.

The above description corresponds to the operations carried out in the arrangement described in WO96/11557. In the present invention, however, the addressing of a call to a particular HLR by the register unit 15 occurs only when one set of predetermined conditions, such as the time of day being within predetermined time limits, holds. Under other predetermined conditions, the call is directed from the register unit 15 to a routing unit 40 or even to a final destination. The routing unit 40 then contains information which re-routes the call back to the switched network 10, but now to another destination telephone, which may either be the same mobile telephone, another mobile telephone, a land-based telephone, or other telecommunications termination service (eg, VPS or other service platform).

In FIG. 1, the register unit 15 and the routing unit 40 are shown as separate components which is currently preferred to an integral arrangement. A call which reaches the register unit under the other predetermined conditions causes the call to be directed to the routing unit 40.

Moreover, there may be circumstances in which the routing unit does not re-route the call back into the switch network 10, but instead acts as a destination for the call. For example, if the mobile telephone which is the desired destination of the call is not available for any reason, the routing unit 40 may terminate the call, possibly transmitting a message to the originating telephone that the desired mobile telephone is not available.

Figure 2:
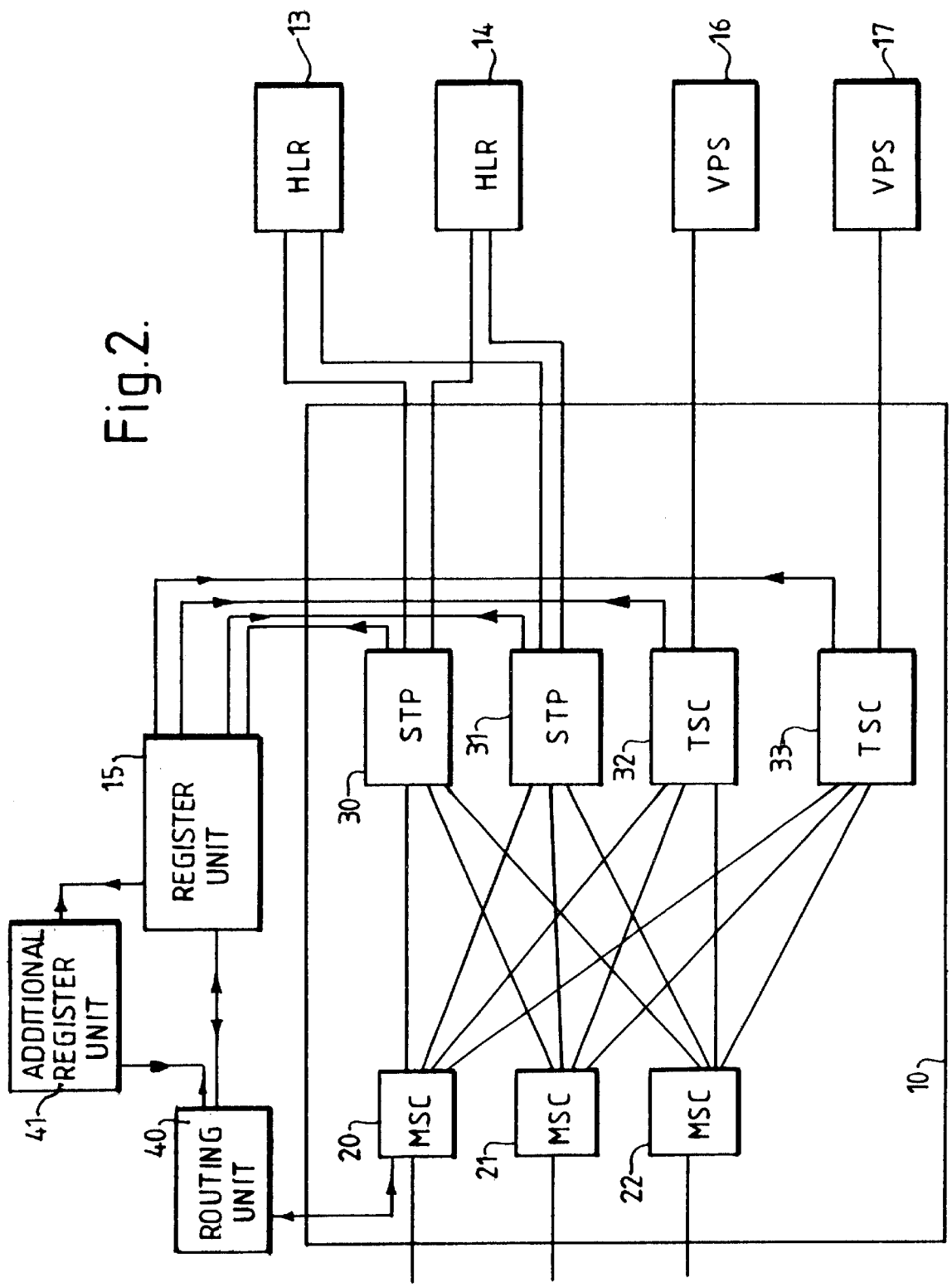
FIG. 2 shows part of the telecommunication system of FIG. 1 in more detail.

FIG. 2 shows the switched network 10 in more detail. It has a plurality of mobile switching centres (MSC) 20,21 and 22, and a call destined for any given mobile telephone results in signalling between that MSC 20 to 22 and one of a plurality of signalling transfer points (STP) 30,31, which signal to the register unit 15.

Under one set of predetermined conditions, scored in the register unit 15, the register unit 15 determines the HLR 13,14 which is appropriate to the mobile telephone 12. The register unit 15 determines that information from the telephone number (MSISDN number) of the mobile telephone 12. It would then be possible for the register unit 15 to forward the signal directly to the appropriate HLR 13,14 but, as shown in FIG. 2, it is preferable that the information is passed back to the corresponding STP 30,31 which then passes the signalling to the correct HLR 13,14.

A similar signalling flow is seen when the user of the mobile telephone 12 tries to access one of the voice processing systems (VPS) 16,17. This is described in more detail in WO96/11557 and therefore will not be described now.

As was mentioned above, this operation only holds for one set of predetermined conditions for a call to the corresponding mobile telephone. Under other predetermined conditions, the call which has passed to the register unit 15 from the corresponding STP 30, 31 is passed to the routing unit 40, which determines a (possibly) new destination for the call and potentially passes the call back to one of the MSCs 20, 21, 22. The switched network 10 then routes that call to an appropriate destination, in the usual way. For example, the call originally destined for a mobile telephone may be re-routed to a land-based telephone, and therefore passed via the switched network 10 to the land-based telephone via the PSTN 11 shown in FIG. 1.

The predetermined conditions under which the register unit 15 operates to signal to the HLRs 13, 14, and those in which it directs the signal to the routing unit 40 will normally vary between one mobile telephone and another. Thus, the register unit must store appropriate conditions for each mobile telephone number. Therefore, it may be necessary to provide an additional register unit 41, connected co the register unit 15, which additional register unit stores various predetermined conditions and which is accessed by the register unit 15 when a signal is received. It may be possible for the user of an individual mobile telephone to signal (possibly via a routing unit 40) to the additional register unit 41 to change the predetermined conditions.

It is not necessary for the additional register unit 41 to be a separate component, and it may be integrated with the register unit 15.

Once the call has been directed by register unit 15 to the routing unit 40, the routing unit 40 must determine its new routing, which new routing may be to terminate the call. Thus, there may be one or more possible routings (for example, depending on time of day) stored by the routing unit for any particular mobile telephone. It may also be noted that although a single routing unit 40 is shown in FIG. 2, there may be multiple routing units, with different mobile telephone numbers associated with different routing units. Furthermore, it is possible to have multiple routing units associated with any particular mobile telephone. This is advantageous when the same service is provided by multiple routing units, and selection of the routing unit which responds to a particular call may depend on the location of the call, with the most convenient located routing unit being used. Suppose now that, under one set of predetermined conditions, all calls are passed to the mobile telephone, and under another set of predetermined conditions only certain types of calls (eg, calls from particular origins such as specified telephone numbers, local calls, etc). In such circumstances, there are some calls that the routing unit 40 has to route to the mobile telephone itself. When such a signal has passed from the routing unit 40 to the connected MSC 20, and from there to the appropriate STP 30, 31, a signal will pass to the register unit 15 since the call is a call to a mobile telephone. However, at that point, the register unit 15 must not pass the call to the routing unit 40 again, even though the conditions for passing a call to the routing unit 40 are met. Otherwise, the call enters a loop.

Thus, in those circumstances, the register unit 15 must detect that the call has already passed via the routing unit 40, and over-ride the call routing to the routing unit 40, despite the predetermined conditions being met. Thus, calls to the originally dialled mobile telephone which have passed through the routing unit 40 must be modified to indicate that routing has already occurred. Preferably, this is carried out by the routing unit 40 and the MSC 20, which can regularly distinguish such calls from the routing unit 40. Therefore, calls from the routing unit 40 can indicate an override operation, for example by being given a revised sub-system number (the allocation of sub-system numbers being a normal function of the MSCs 20, 21, 22). When such signals pass via the STPs 30, 31 to the register unit 15, the register unit detects the override and re-directs the calls to the appropriate HLR 13, 14 as discussed in WO96/11557. A loop is thus avoided.

Thus, the present invention permits different call routings to be applied under different conditions, which routings are transparent to the user originating the call. There is no need for that user to be told to dial a different number, or for the destination number to have some separate re-routing function, as exists in some PABXs. The destination number may be a normal mobile telephone (or indeed a land-based telephone or some other service), and all routing is controlled within the switch network 10, the register unit 15 and the routing unit 40.

Only limited modification to the register unit 15 used in WO96/11557 is needed in order to carry out the present invention; that register unit must be able to direct calls to the or one of the routing unit(s) rather than direct them to the appropriate HLR 13, 14, and must contain a database which stores the predetermined conditions under which the register unit 15 passes the calls to the HLRs 13, 14 or directs the calls to the routing unit 40. In general, the register unit 15, or the additional register unit 41, will store routing service information (for example, in the form of a table) for each mobile telephone number.

As in WO96/11557, the signal which a mobile telephone passes to the switch network, and by which the mobile telephone is recognised, need not be fixed, but may be alterable, for example by insertion into the telephone of a card carrying data. Thus, a user can identify himself or herself to the switch network by insertion inch a mobile telephone of a personal card which identifies him or her, and subsequent routing to an appropriate VPS or other service can be performed on the basis of the user's identity.

What is claimed is:

1. A switch network for a telecommunication system including a plurality of telecommunication devices, the switch network comprising:

a plurality of data storage units for storing connection data relating to one or more respective telecommunication devices;

a register unit for storing associations between said data storage units and one or more respective identification codes;

input means for inputting one of said one or more respective identification codes;

a switch unit for interrogating said register unit to determine the data storage unit associated with said one identification code;

link means for using the connection data stored by said data storage unit association with said one identification code to form a telecommunication link with one of said corresponding one or more telecommunication devices; and at least one routing unit;

wherein there is at least one predetermined condition which determines a first and a second state of said register unit, said register unit and said switch unit being arranged to determine the data storage unit associated with said identification code input by said input means when said register unit is in said first state, and to link said register unit and said switch unit to said at least one routing unit when said register unit is in the second state.

2. A switch network according to claim 1, wherein said connection data is location data indicating the location of said corresponding one or more telecommunication devices.

3. A switch network according to claim 1 in which said register unit stores further information associated with said plurality of telecommunication devices, said switch network including means for interrogating said register unit in response to a signal to extract said further information associated with a specified one of said plurality of telecommunication devices, said link means forming a further telecommunications link in dependence upon said further information.

4. A switch network according to claim 3 further comprising means for changing said further information.

5. A switch network according to claim 1, having a plurality of said routing units.

6. A switch network according to claim 1, having means for altering the associations stored by said register unit.

7. A switch network according to claim 1 having an additional register unit for storing said at least one predetermined condition.

8. A telecommunication system comprising®
a plurality of telecommunication devices; and
a switch network having a plurality of data storage units for storing connection data relating to one or more respective telecommunication devices;
a register unit for storing associations between said data storage units and one or more respective identification codes;
input means for inputting one of said one or more respective identification codes;
a switch unit for interrogating said register unit to determine the data storage unit associated with said one identification code;
link means for using the connection data stored by said data storage unit association with said one identification code to form a telecommunication link with one of said corresponding one or more telecommunication devices; and
at least one routing unit;
wherein there is at least one predetermined condition which determines a first and a second state of said register unit, said register unit and said switch unit being arranged to determine the data storage unit associated with said identification code input by said input means when said register unit is in said first state, and to link said register unit and said switch unit to said at least one routing unit when said register unit is in the second state.

9. A telecommunication system according to claim 8, wherein at least some of said plurality of telecommunication devices are mobile telephones.

10. A telecommunication system according to claim 8, wherein at least some of the telecommunication devices are associated with services provided to the user.

11. A method of operating a switch network of a telecommunication system including a plurality of telecommunication devices, the method comprising:
storing connection data relating to one or more respective telecommunication devices in a plurality of data storage units;
storing associations between said data storage units and one or more respective identification codes in a register unit, said register unit having first and second states defined by at least one predetermined condition;
inputting an identification code;
interrogating said register unit when said register unit is in the first state to determine the data storage unit associated with said input identification code, and using the connection data stored by that data storage unit to form a telecommunication link with one of the corresponding one or more telecommunication devices; and
interrogating at least one routing unit when the register unit is in the second state to derive information from said routing unit to form the telecommunications link.

12. A method according to claim 11, wherein said at least one predetermined condition determines a third state of said register unit.

13. A method according to claim 11, wherein said at least one predetermined condition relates to at least one of time of day, time of week, and said corresponding telecommunication device.

14. A method according to claim 11, wherein said association stored by the register unit are alterable.

* * * * *